(12) United States Patent
Thyssen

(10) Patent No.: US 6,290,574 B1
(45) Date of Patent: Sep. 18, 2001

(54) METHOD AND DEVICE FOR CENTERING A DRESSING TOOL IN THE THREAD OF A GRINDING WORM

(75) Inventor: Wolfgang Thyssen, Bad Säckingen (DE)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/506,364

(22) Filed: Feb. 18, 2000

(30) Foreign Application Priority Data

Mar. 11, 1999 (DE) .............................................. 199 10 747

(51) Int. Cl.[7] .................................................... B24B 53/06
(52) U.S. Cl. ................... 451/9; 451/10; 451/11; 451/56; 451/443; 451/21
(58) Field of Search ................... 451/56, 9, 10, 451/11, 21, 443, 5, 407

(56) References Cited

U.S. PATENT DOCUMENTS 4,903,679 * 2/1990 Kiger et al. ............................ 451/56
5,738,569 * 4/1998 Mackowsky ........................... 451/56
5,957,752 * 9/1999 Katakura ............................... 451/56
6,146,253 * 11/2000 Litvin et al. .......................... 451/56

FOREIGN PATENT DOCUMENTS

19706867A1   8/1998  (DE) .

* cited by examiner

Primary Examiner—Eillen P. Morgan
(74) Attorney, Agent, or Firm—Browdy and Neimark, PLLC

(57) ABSTRACT

In a first step for the purpose of precentering, the dressing too; (27), without axial movement, is brought into contact with the circumference of the rotating grinding worm (11), and those rotary-angle positions of the grinding worm (11) at which the overrunning of the thread gap (36) starts of ends are determined by means of an acoustic-sensor signal and the shaft-angle encoder (18) of the grinding spindle (16). In a second step for the purpose of precision centering, the dressing tool (27) fed into the thread gap (36) is brought into contact with the left-hand and right-hand tooth flanks (38, 39) by axial displacement. In this case, the axial infeed is stopped by means of the acoustic-sensor signal, and the exact grinding-worm thread center is calculated from the contact positions of the dressing tool (27) achieved.

10 Claims, 1 Drawing Sheet

METHOD AND DEVICE FOR CENTERING A DRESSING TOOL IN THE THREAD OF A GRINDING WORM

BACKGROUND OF THE INVENTION

Prior Art

On account of its high quality and productivity, continuous generation grinding of gears is considered to be one of the hard finishing processes, which have also become widespread in the large-scale manufacture of gears. The grinding tool, the so-called grinding worm, is a cylindrical grinding wheel which has at its circumference a rack-like worm-shaped profile, which during grinding can be brought into meshing engagement with the premachined workpiece toothing. The grinding worms are profiled with rotating dressing discs which are coated with hard-material grains, engaged in the grinding worm thread during the dressing and, while in contact with one flank or simultaneously with both flanks of the grinding worm thread, is displaced in accordance with the pitch of the latter parallel to the grinding-wheel axis.

When re-using a grinding worm which is already profiled or when using a new rough-profiled grinding worm, the task of the operator, as a requirement for the subsequent automatic dressing process, is to manually determine the axial position of the existing grinding-worm thread and to accordingly positioning the dressing tool axially. In this case, axial position of the thread center is determined by the dressing tool being fed into the tread of the grinding worm and then being displaced parallel to the grinding worm axis until audible or visible contact with the grinding worm thread flanks occurs. This method is time-consuming and requires skill, since the contact between dressing tool and grinding worm can often only be detected with difficulty because of poor accessibility of the engagement point, and the centering of the dressing tool, on account of the small dressing infeed amount, in particular in the case of CBN grinding worms (abrasive grains of cubic boron nitride), has to be very accurate.

OBJECT OF THE INVENTION

The object of the invention described below is to specify a method and a device, by means of which the centering of the dressing tool proceeds automatically and consumes considerably less time.

BRIEF DESCRIPTION OF THE INVENTION

The functional sequence of the centering process according to the invention for various embodiments of dressing tools is described below with reference to the drawings.

Figure 1:
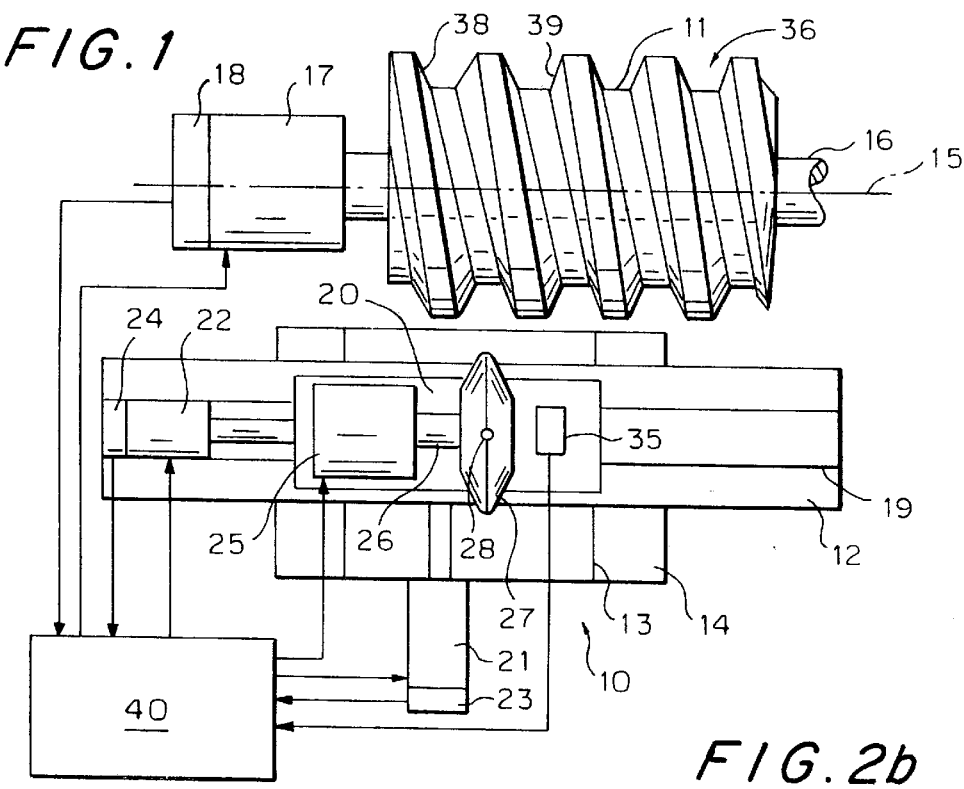

FIG. 1 shows a grinding spindle with grinding worm and the construction of a dressing device for carrying out the method according to the invention.

Figure 2A:
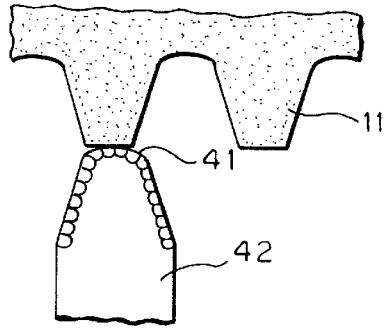
Figure 2B:
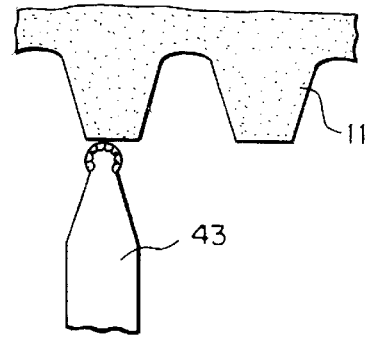
Figure 2C:
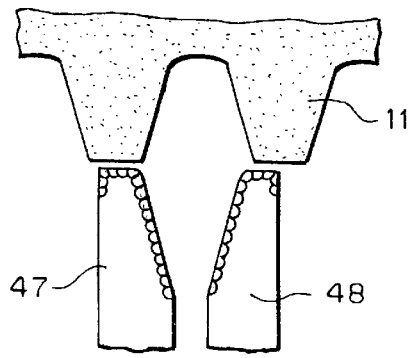

In FIGS. 2a to 2c, various types of dressing tools are shown in contact with the grinding worm.

Figure 3:
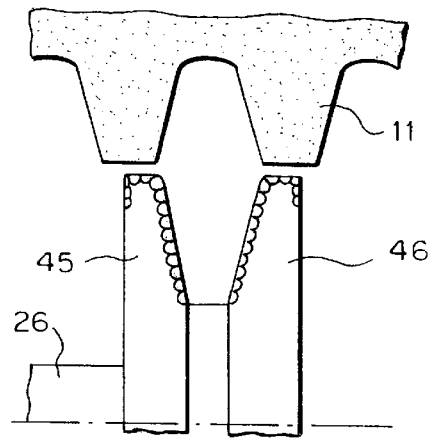

FIG. 3 shows the contact between the grinding worm and a so-called diamond roll set, the axis of rotation of which is pivoted slightly relative to the grinding worm axis for the precentering.

DETAILED DESCRIPTION OF THE PREFERRED EMBODIMENT(S) OF THE INVENTION

FIG. 1 shows a dressing device 10 for dressing a grinding worm 11. The dressing device may be designed, for example, according to DE-A 197 06 867.7. It comprises a cross slide, a first slide 12 being displaceable along a guide 13 of a machine base 14 perpendicularly to the axis 15 of the grinding spindle 16. The grinding worm 11 is mounted on the spindle 16, which is driven by a motor 17 and is connected to a rotary encoder 18. On the slide 12, a second slide 20 is displaceable guided in a guide 19 parallel to the axis 15. The slides 12, 20 are each displaceable by a respective motor 21, 22 with displacement feedback 23, 24. Mounted on the slide 20 is the dressing motor 25, which drives the dressing spindle 26, on which the dressing disc 27 is mounted. The dressing disc 27 may be additionally pivotable about an axis 28 perpendicular to the direction of the guides 13, 19 (see DE-A 197 06 867.7).

In addition, an acoustic sensor 35 is mounted on the slide 20. All the servomotors 17, 21, 22, the rotary encoders 18, 23, 24, the motor 25 and the acoustic sensor 35 are connected to a control device 40.

Unlike the representation according to FIG. 1, the grinding spindle 16 may also be mounted on a cross slide for the relative movement between the grinding worm 11 and the dressing wheel 27, for which purpose, however, the dressing spindle 26 is mounted in a fixed position on the machine base. This variant is advantageous in particular when the grinding worm 11 is moved parallel to and perpendicular to the axis 15 for grinding the workpieces. In this case, the same NC axes of the machine may be used for both grinding and dressing, as described in DE-A 196 25 370.5.

The centering operation of the dressing disc 27 is effected in two steps.

The first step serves to precenter the dressing tool. To this end, the grinding worm 11 and dressing disc 27 are set in rotation, and the dressing disc 27, with slide 20 stationary, is fed in the radial direction to the grinding worm 11 until the acoustic sensor 35 fastened to the slide 20 signals contact with the circumference of the grinding worm 11. The slide 12 is stopped in response to the signal of the sensor 35. After that, those rotary angles of the grinding worm 11 at which the contact ceases or starts again as a result of overrunning the gap 36 of the grinding worm thread are measured by means of the rotary encoder 18. From this, the control 40 determines the grinding spindle rotary angle at which the dressing disc 27 is approximately in the thread gap center of the grinding worm 11.

In order to obtain a clearly defined allocation of the signals of the acoustic sensor 35 to the axial position of the grinding worm thread gap 36, the dressing disc 27, at its periphery, is either designed to be toroidal, as shown in FIGS. 1 and 2b, or, if the root 37 of the grinding-worm thread is to be dressed in linear contact, essentially cylindrical, but slightly crowned, as shown in exaggerated fashion in FIG. 2a. The outer circumference of the essentially cylindrical periphery 41 of the profile dressing roll 42 is slightly larger at the center, i.e. by 0.5 mm at most, than at the two axial ends of the periphery 41.

A variant of the precentering consists in bringing the rotating dressing tool 27 manually into contact with the generating line of the stationary grinding worm 11 and, during the subsequent displacement of the dressing tool along the generating line of the grinding worm 11, in determining by means of the acoustic sensor 35 the start and end of one of the generating line sections at which the contact between dressing disc 27 and grinding worm 11 is interrupted when overrunning the gap 36 of the thread in the axial direction.

In the second step, the precision centering, the rotating dressing disc 27 is fed into the thread gap center, determined in step 1, of the likewise rotating grinding worm 11 right into the vicinity of the tooth root, the slide 20 being displaced in the y-direction in synchronism with the rotary angle of the grinding spindle 16. A slow infeed movement in the positive and negative y-direction is superimposed on this y-movement until the contact of the two flanks 38, 39 of the grinding worm 11 is measured one after the other with the acoustic sensor 35. The average of the additional movements measured in the process, in combination with the rotary angle of the grinding spindle 16, then delivers the exact thread gap center.

Starting from the thread gap center thus determined, the dressing process may now be started after the infeed of the dressing disc 27 to the full depth of the thread of the grinding worm 11.

During the profiling of the grinding worm 11 with a profile dressing roll 42 (FIG. 2a) or a radius profile roll 43 (FIG. 2b), the centering operation is effected in the same way. On the other hand, if two individual single tapered dressing discs 47, 48 (FIG. 2c) or a diamond roll set 44 (FIG. 3) which is formed from a plurality of dressing discs 45, 46 mounted coaxially on the dressing spindle 26 are used for the profiling, that dressing disc 45, 46 with which the precentering operation is to be carried out is designed with a slightly enlarged outside diameter, as a result of which this dressing disc clearly makes contact with the grinding worm circumference in step 1.

If the dressing discs 45, 46 of he diamond roll set as in FIG. 3 have the same diameter, to same effect is achieved by slightly pivoting the dressing spindle 26, before step 1 is carried out, about the pivot axis 28, which is perpendicular to the displacing directions x and y and is present in some dressing devices for other purposes.

What is claimed is:

1. A method of centering a dressing tool in a thread of a grinding worm, a thread having opposed first and second flanks, a cylindrical outer surface and a root, the grinding worm being connected to a rotary encoder to measure a rotating angel of the grinding worm, the method comprising the steps of:
   precentering the dressing tool relative to the thread comprising the steps of:
   rotating the grinding worm,
   rotating the dressing tool without axial feed motion of the dressing tool,
   infeeding the dressing tool radially relative to the grinding worm until a circumference of the dressing tool comes into contact with the cylindrical surface,
   sensing noise adjacent to an outside diameter of the grinding worm and the dressing tool by an acoustic sensor,
   detecting if a signal of the acoustic sensor is above or below a preselected fist value in relation to the rotating angle of the grinding worm and storing that information,
   determining a middle position between the first and second tooth flanks from the relationship between the sensor signal and the rotating angle of the grinding worm,
   the precentering steps being succeeded by precision centering steps comprising the steps of:
   feeding the rotating dressing tool into the thread of the rotating grinding worm in the middle position between the first and second tooth flanks to a radial position between a diameter of the cylindrical surface and a diameter of the root and moving the dressing tool in an axial direction of the grinding worm synchronously with the rotating grinding worm to follow the thread,
   superimposing on the synchronous axial movement of the dressing tool an additional axial movement in both senses until the dressing tool comes into contact with the first and second flanks,
   sensing a moment of contact between the dressing tool and the respective flank by the sensor and stopping the additional axial movement when the sensor signal exceeds a second preselected value,
   calculating an accurate center of the thread from measurements achieved of the relative additional axial movement of the dressing tool in the two senses.

2. The method of claim 1 wherein the precentering steps and the precision centering steps are performed automatically by an electronic control device.

3. The method of claim 1, in which the dressing tool is a diamond roll set composed of two discs each disc having a dressing tool flank, one of the tool flanks being adapted to dress the first thread flank and the other tool flank being adapted to dress the second thread flank, the two discs having different outside diameters, wherein the steps of precentering are performed with the disc of the larger outside diameter.

4. The method of claim 1 further comprising prior to carrying out the precentering steps pivoting an axis of rotation of the grinding worm relative to an axis of rotation of the dressing tool by an angle larger than but close to zero.

5. A method of centering a dressing tool in a thread gap of a grinding worm the thread of the grinding worm having opposed first and second flanks, a cylindrical outer surface and a root, the grinding worm being connected to a rotary encoder to measure a rotating angel of the grinding worm, the method comprising the steps of:
   precentering the dressing tool relative to the thread comprising the steps of:
   rotating the dressing tool while holding the grinding worm stationary,
   infeeding the dressing tool radially into contact with the outer surface,
   moving the dressing tool axially relative to the grinding worm,
   sensing noise generated by contact of the dressing tool with the outer surface by a sensor,
   detecting when the noise sensed by the sensor is above and below a preselected first value in relation to an axial position of the dressing tool,
   calculating a middle position from the axial position obtained in the preceeding step, the precentering steps being succeeded by precision centering step comprising:
moving the dressing tool axially to the middle position,
infeeding the dressing tool radially to a position between the cylindrical surface and the root,
moving the dressing tool axially in a first sense until the noise sensed by the sensor exceeds a second value and storing a first axial position of the dressing tool,
moving the dressing tool axially in an opposite second sense until the noise of the sensor exceeds the second value and storing a second axial position of the dressing tool,
calculating an accurate centering position as an average between the first and second positions.

6. The method of claim 5 wherein the precentering steps and the precision centering steps are performed automatically by an electronic control device.

7. The method of claim 5, in which the dressing tool is a diamond roll set composed of two discs each disc having a dressing tool flank, one of the tool flanks being adapted to dress the first thread and the other tool flank being adapted to dress the second thread flank, the two discs having different outside diameters, wherein the steps of precentering are performed with the disc of the larger outside diameter.

8. The method of claim 5, further comprising prior to carrying out the precentering steps pivoting an axis of rotation of the grinding worm relative to an axis of rotation of the dressing tool by an angle larger than but close to zero.

9. A device for centering a dressing tool in a thread of a grinding worm, the thread having opposed first and second flanks, a cylindrical outer surface and a root, the grinding worm being connected to a rotary encoder to measure a rotating angle of the grinding worm, the device comprising:
a grinding spindle, rotatable about a first axis, for mounting the grinding worm, the grinding spindle being connected to a first motor and to a first rotary encoder,
a dressing spindle which can be fed in relative to the grinding spindle radially to the first axis, is displaceable parallel to the first axis, is rotatable about a second axis and is intended for mounting a dressing disc, the dressing spindle being driven by a second motor,
a first and a second slide for carrying out the relative movements between the dressing spindle and the grinding spindle, both sides being connected to respective servomotor and to a respective second to third rotary encoder,
an NC control device which is connected to the first and the second motor, to the two servomotors and to all the rotary encoders, and
an acoustic sensor connected to the NC control device and arranged adjacent to the grinding spindle or to the dressing spindle and in that the NC control device is programmed in such a way that it automatically carries out the following centering steps, after the grinding worm has been mounted on the grinding spindle, the centering steps comprising:
precentering the dressing tool relative to the thread comprising the steps of:
rotating the grinding worm,
rotating the dressing tool without axial feed motion of the dressing tool,
infeeding the dressing tool radially relative to the grinding worm until a circumference of the dressing tool comes into contact with the cylindrical surface,
sensing noise adjacent to an outside diameter of the grinding worm and the dressing tool by an acoustic sensor,
detecting if a signal of the acoustic sensor is above or below a preselected first value in relation to the rotating angle of the grinding worm and storing that information,
determining a middle position between the first and second tooth flanks from the relationship between the sensor signal and the rotating angle of the grinding worm,
the precentering steps being succeeded by precision centering steps comprising the steps of:
feeding the rotating dressing tool into the thread of the rotating grinding worm in the middle position between the first and second tooth flanks to a radial position between a diameter of the cylindrical surface and a diameter of the root and moving the dressing tool in an axial direction of the grinding worm synchronously with the rotating grinding worm to follow the thread,
superimposing on the synchronous axial movement of the dressing tool an additional axial movement in both senses until the dressing tool comes into contact with the first and second flanks,
sensing a moment of contact between the dressing tool and the respective flank by the sensor and stopping the additional axial movement when the sensor signal exceeds a second preselected value,
calculating an accurate center of the thread from measurements achieved of the relative additional axial movement of the dressing tool in the two senses.

10. A device for centering a dressing tool in a thread of a grinding worm, the thread having opposed first and second flanks, a cylindrical water surface and a root, the grinding worm being connected to a rotary encoder to measure a rotating angle of the grinding worm, the device comprising:
a grinding spindle, rotatable about a first axis, for mounting the grinding worm, the grinding spindle being connected to a first motor and to a first rotary encoder,
a dressing spindle which can be fed in relative to the grinding spindle radially to the first axis, is displaceable parallel to the first axis, is rotatable about a second axis and is intended for mounting a dressing disc, the dressing spindle being driven by a second motor,
a first and a second slide for carrying out the relative movements between the dressing spindle and the grinding spindle, both slides being connected to a respective servomotor and to a respective second to third rotary encoder,
an NC control device which is connected to the first and the second motor, to the two servomotors and to all the rotary encoders, and
an acoustic sensor connected to the NC control device and arranged adjacent to the grinding spindle or to the dressing spindle and in that the NC control device is programmed in such a way that it automatically carries out the following centering steps, after the grinding worm has been mounted on, the grinding spindle the centering steps comprising:
precentering the dressing tool relative to the thread comprising the steps of:
rotating the dressing tool while holding the grinding worm stationary,
infeeding the dressing tool radially into contact with the outer surface, moving the dressing tool axially relative to the grinding worm, sensing noise generated by contact of the dressing tool with the outer surface by a sensor, detecting when the noise sensed by the sensor is above and below a preselected first value in relation to an axial position of the dressing tool, calculating a middle position from the axial position obtained in the preceding step, the precentering steps being succeeded by precision centering step comprising;

moving the dressing tool axially to the middle position, infeeding the dressing tool radially to a position between the cylindrical surface and the root, moving the dressing tool axially in a first sense until the noise sensed by the sensor exceeds a second value and storing a first axial position of the dressing tool, moving the dressing toll axially in an opposite second sense until the noise of the sensor exceeds the second value and storing a second axial position of the dressing tool, calculating an accurate centering position as an average between the first and second positions.

\* \* \* \* \*